United States Patent
Fan

Patent Number: 6,157,462
Date of Patent: Dec. 5, 2000

[54] METHOD AND APPARATUS FOR ERROR DIFFUSION AND UNDERCOLOR REMOVAL/GREY COMPONENT REPLACEMENT OF DIGITAL COLOR IMAGES

[75] Inventor: Zhigang Fan, Webster, N.Y.

[73] Assignee: Xerox Corporation, Stamford, Conn.

[21] Appl. No.: 09/082,157

[22] Filed: May 20, 1998

[51] Int. Cl.[7] .............................. H04N 1/52; H04N 1/60
[52] U.S. Cl. ........................... 358/1.9; 358/529; 358/534
[58] Field of Search .................................. 358/530, 532, 358/533, 534, 536, 537, 515, 518, 521, 1.9, 529; 382/164, 162, 167, 298, 299, 275, 252

[56] References Cited

U.S. PATENT DOCUMENTS

| | | |
|---|---|---|
| 5,521,989 | 5/1996 | Fan . |
| 5,565,994 | 10/1996 | Eschbach . |
| 5,838,885 | 11/1998 | Shu et al. .............................. 395/109 |

*Primary Examiner*—Scott Rogers
*Attorney, Agent, or Firm*—Fay, Sharpe, Fagan, Minnich & McKee, LLP

[57] ABSTRACT

A method and apparatus for printing a digital color images wherein the application of both colored inks and black ink to a common location is prevented to minimize ink usage, and to provide a more uniform distribution of black and colored pixels. Input pixel data is received at a first depth in terms of 'c' bits per pixel, wherein 'c' is an integer, for at least three color separations of a digital color image. Pixel data at the first depth of 'c' bits per pixel is derived for a fourth separation of the digital color image based upon the pixel data of the three color separations. Error diffusion is performed on the pixel data of the fourth separation to redefine the pixel data at a second depth of 'd' bits per pixel, where 'd' is an integer and 'd'<'c'. For each pixel of each of the three color separations, correspondingly located binary pixel data of the fourth separation is subtracted therefrom, and error diffusion is performed on the pixel data of each of the three color separations to redefine the pixel data of each pixel of each color separation in terms of 'd' bits per pixel. The pixel data is output in terms of 'd' bits per pixel for each of the three color separations and the fourth separation to an output device.

13 Claims, 3 Drawing Sheets

METHOD AND APPARATUS FOR ERROR DIFFUSION AND UNDERCOLOR REMOVAL/ GREY COMPONENT REPLACEMENT OF DIGITAL COLOR IMAGES

BACKGROUND OF THE INVENTION

The present invention relates to the digital color image processing arts. It finds particular application in conjunction with color digital image half-toning, and will be described with particular reference thereto. However, it is to be appreciated that the invention is amenable to other applications.

Color in printed digital images results from the combination of a limited set of colors over a small area in densities selected to integrate the desired color response. This is accomplished in many printing devices by reproducing so called "separations" of the image, where each separation provides varying grey values of a single primary color. When the separations are combined together, the result is a full color image.

The particular color of each separation depends on the "color-space" being implemented. Two of the most commonly used color spaces include red-green-blue (RGB) and cyan-magenta-yellow (CMY). The RGB color-space is "additive"—i.e., it uses the addition of select amounts of the primary colors to a black background, with an equal mixture of the three primary colors producing white. In contrast, the CMY color-space is "subtractive"—i.e., the cyan, magenta, and yellow inks remove the primary colors red, green, and blue, respectively, from light reflected off of a white background so that an equal mixture of the three CMY inks produces black due to the absorption of all color.

In practice, color images are often printed in the cyan-magenta-yellow-black (CMYK) color-space. This color-space is based upon the CMY color-space, but attempts to improve the quality of "black" in the image and reduce use of color inks. In theory, images can be printed using the CMY color space, with a mixture of the three colors producing black. In practice, however, printing with only cyan, magenta, and yellow inks often does not produce the highest quality black, but instead results in a muddy brownish output due to impurities in the inks, the particular paper or other image recording media used, and the partial reflection of light instead of its complete absorption into the inks. Furthermore, select use of black ink in place of the primary colors reduces expense and minimizes the total amount of ink used which is often desirable in ink-jet and other printing applications where the ability of the recording substrate to absorb ink is limited.

Methods for converting from the CMY color space to the CMYK color space are commonly referred to as "undercolor removal" (UCR) and "grey-component replacement" (GCR). UCR/GCR methods vary, but commonly involve examining the individual pixels of an image using the lowest or "darkest" of the three cyan-magenta-yellow colors to determine an amount of black to be added (Undercolor Removal). One or more of the CMY colors are then adjusted to account for the addition of black ink (Grey Component Replacement). For example, if a given pixel of an image is represented in the CMY color space by C=0.5, M=0.4, and Y=0.25, then the black or K value would be based upon the lowest or Y value. In a 50% undercolor removal (UCR) method, K=50% of Y=0.125. In a typical grey component replacement (GCR) step, the remaining CMY values would then each be reduced by 0.125 so that the resulting UCR/GCR pixel is represented by C=0.375, M=0.275, Y=0.125, and K=0.125. Of course, other UCR/GCR methods are known, but each seeks to determine the level of black for a given pixel, and to thereafter adjust the other colors accordingly to account for the addition of black ink.

In the digital processing of color images, the individual color separations are conveniently represented as monochromatic bitmaps, which may be described as an electronic image with a plurality of discrete elements (hereinafter "pixels" ) defined by position and grey value. In such a system, grey value is described as one level in a number of possible states or levels. When more than two different levels are used in the description of an image, the levels are termed "grey" (without regard to the actual color) to indicate that the pixel value is between some maximum and minimum grey level. Most printing systems have the ability to reproduce an image with only a small number of grey values per pixel, most commonly two, although other numbers are possible. A printing system that is able to reproduce only two grey values for each pixel is said to produce binary output, i.e., the pixel is either "on" or "off."

On the other hand, image input devices, including digital cameras, scanners, and the like, are capable of describing each pixel of an image with many grey levels, for example 256 grey levels. Such input data is commonly called "continuous" or "contone" data. Accordingly, it is necessary that the input contone image (with many "grey" levels) be describable with the smaller set of grey levels reproducible by the output device in a manner that captures the intent of the user. In the digital reproduction of color images, this means that each of the color separations of the color-space must be reduced from the large number of continuous grey levels as input, to the smaller number of levels suitable for output. The multiple color separations are then combined together for printing to yield the final color print.

Given that common image output devices are "binary"—i.e., produce either "on" or "off" pixels for each color separation, it is necessary to employ halftoning techniques for each color separation to achieve the desired color within each separation before the color separations are combined for printing. Through halftoning, grey value variation within a color separation is represented by controlling the number of pixels that are "on" within a discrete area or cell of the separation. In such cases, the human eye and brain interpret the controlled number of "on" pixels in a halftone cell as a "grey level," with greater numbers of "on" pixels in a given cell or area being interpreted as darker color. In theory, a human observer does not see the individual "on" and "off" pixels within a halftone cell, but instead sees an average amount of ink on paper. In practice, the effectiveness of halftoning methods varies.

"Error diffusion" is one commonly employed halftoning method and is taught in "An Adaptive Algorithm for Spatial Greyscale" by Floyd and Steinberg, Proceedings of the SID 17/2, 75–77 (1976). Numerous other error diffusion methods are known. For example, commonly assigned U.S. Pat. No. 5,565,994 to Eschbach describes an error diffusion method particularly suited for application to multiple separation color documents. The foregoing documents are expressly incorporated by reference herein for their teachings.

In typical error diffusion methods, the different color components of a color image are separated from each other and error diffusion is performed on each separation. The output for each pixel ("on" or "off") is determined by comparing each pixel to a threshold. Input pixels of a grey value greater than the threshold are set to "on" while input pixels of a grey value less than the threshold are set to "off." However, unlike other halftoning methods, the difference or "error" between the actual grey value of a pixel and the resulting binary "on" (1) or "off" (0) states is not discarded. Instead, it is propagated to adjacent pixels so that it may be accounted for or "recovered" at some point. Thus, for example, even though an adjacent pixel may have an actual input continuous tone grey value less than the threshold, if an error from one or more previous pixels is added to the actual input value of the adjacent pixel, the adjacent pixel may thereafter exceed the threshold and be set to "on," thus recovering the previous error(s).

Heretofore, the foregoing digital color image processing techniques have been carried out without regard to each other. More particularly, the continuous-tone or "contone" CMY data was subjected to a UCR/GCR processing step as discussed above, and, thereafter, error diffusion was performed on each of the CMYK color separations. While such prior techniques are somewhat satisfactory, they are suboptimal in many instances and image quality varies with particular printing conditions. By way of another example, a uniform black region of an image is represented by each pixel having C=M=Y=1 before UCR/GCR. After a 50% UCR/GCR method is applied to each pixel, C=M=Y=K=0.5. If, as is done with prior techniques, error diffusion is then performed on each of the CMYK separations independently, each of the separations will have ½ of the pixels "on" (i.e, set to 1) and the other ½ off (i.e., set to 0). Under perfect or ideal printing conditions (perfect registration, square ink coverage, etc.), the desirable state will be C=M=Y=0 where K=1, and C=M=Y=1 where K=0. In other words, half of the pixels in the printed uniform black region will be covered by true black ink, and the other half of the pixels will be covered by equal amounts of CMY inks which also appears black. This produces an almost uniform black output.

However, as error diffusion results depend upon image boundary conditions, such uniform black output will rarely, if ever, occur. In a particular undesirable circumstance, where all four of the color separations are subjected to the same error diffusion, for example, the resulting printed image will be comprised of half the pixels covered by a combination of all four CMYK inks (C=M=Y=K=1) and the other half of the pixels being left blank (C=M=Y=K=0). Obviously, such printed output would not appear as the desired uniform black region. Other boundary conditions result in even less desirable printed output—e.g., noisy patches within the final printed image. Prior attempts to overcome these difficulties, such as working in density have somewhat alleviated the problem, but result in use of more ink and greater ink coverage, which is expensive, and not desirable for inkjet and other printing methods.

Accordingly, it is deemed desirable to develop a digital color imaging processing method that interrelates UCR/GCR techniques and error diffusion techniques that results in printed output wherein CMY and K pixels are uniformly distributed throughout the image and that prevents undesirable printing of color CMY inks and black K ink at the same location.

SUMMARY OF THE INVENTION

The present invention provides a new and improved method and apparatus for halftoning a color image.

In accordance with a first aspect of the present invention a method of printing a digital color image includes receiving input pixel data at a first depth in terms of "c" bits per pixel, wherein 'c' is an integer, for at least three color separations of a digital color image, and deriving pixel data at the first depth of 'c' bits per pixel for a fourth separation of the digital color image based upon the pixel data of the three color separations An error diffusion operation is performed on the pixel data of the fourth separation to redefine the pixel data at a second depth of 'd' bits per pixel, where 'd' is an integer and 'd'<'c'. For each pixel of each of the three color separations, correspondingly located pixel data of the fourth separation is subtracted therefrom, respectively. An error diffusion operation is performed on the pixel data of each of the three color separations to redefine the pixel data of each pixel of each separation in terms of 'd' bits per pixel. The pixel data is output in terms of 'd' bits per pixel for each of the three color separations and the fourth separation to an output device.

In accordance with another aspect of the present invention, a method of halftoning a continuous tone digital color image is provided. The digital color image is defined in terms of at least a first cyan pixel data separation, a second magenta pixel data separation, and a third yellow pixel data separation, each of said separations including pixel data for a plurality of pixels arranged in 'm' rows and 'n' columns. From the pixel data at each pixel location (m,n) of the first, second, and third separations, continuous tone black pixel data is derived for each location (m,n) to define a fourth, black pixel data separation. Error diffusion is performed on the continuous tone pixel data of the fourth, black pixel data separation to convert the continuous tone black pixel data at each location (m,n) to binary pixel data. For each pixel location (m,n) of each of the first, second, and third pixel data separations, the corresponding binary black pixel data of the fourth separation at location (m,n) is subtracted therefrom. An error diffusion halftoning operation is performed on each of the first, second, and third pixel data separations to convert the continuous ton pixel data of each separation into binary pixel separation data.

In accordance with another aspect of the preset invention, a method of halftoning a digital color image includes receiving continuous tone input pixel data for at least first, second, and third color separations and a fourth black separation of the digital color image, wherein the continuous tone pixel data (or a function of the continuous tone pixel data) of each pixel of the fourth black separation has been previously subtracted on a pixel-by-pixel basis from the continuous tone pixel data of each pixel of the first, second, and third color separations. For all pixels of the first, second, and third color separations, respectively the continuous tone pixel data from the corresponding pixel location of the fourth black separation is added thereto. An error diffusion halftoning operation is performed on the continuous tone pixel data of the black separation to derive binary pixel data for each pixel of the black separation. For the continuous tone pixel data at each pixel location of the first, second, and third color separations, binary black pixel data from a corresponding location of the fourth black separation is subtracted therefrom. An error diffusion operation is then performed on the continuous tone pixel data of the first, second, and third color separations to derive binary pixel data for each pixel of each of the first, second, and third separations.

In accordance with another aspect of the invention, an image processing unit for halftoning a digital color image includes means for receiving continuous tone pixel data for at least first, second, and third color separations, and means, connected to the receiving means, for deriving continuous tone pixel data of a fourth black separation based upon the pixel data of the first, second and third separations. The image processing unit also includes means for performing error diffusion halftoning on the continuous tone pixel data of the fourth black separation to convert the continuous tone pixel data for each pixel into binary pixel data defining one of a pixel 'on' condition and a pixel 'off' condition, and means for receiving the binary pixel data of the fourth black separation and for subtracting the binary pixel data for each black pixel respectively from the continuous tone pixel data for each pixel of the first, second, and third color separations. The image processing unit further includes means, connected to receive continuous tone data from the subtracting means, for performing error diffusion halftoning on the continuous tone pixel data of the first, second, and third color separations to convert the continuous tone color pixel data for each pixel of each color separation into binary pixel data defining one of a pixel 'on' condition and a pixel 'off' condition.

One advantage of the present invention is that it provides a new and improved digital color image processing method and apparatus.

Another advantage of the present invention resides in the production of printed color images of superior color consistency, and clarity.

Still another advantage of the present invention is that it prevents application of both colored and black ink at the same location on a printed page, and discourages clustering of black and colored pixels.

A further advantage of the present invention is that it minimizes ink usage without compromising coverage.

A still further advantage of the present invention is that it reduces or eliminates noisy patches in the resulting color printed image.

Another advantage of the present invention is found in its improved predictability of halftone separations, with the associated improved color consistency.

Still other benefits and advantages of the present invention will become apparent to those of ordinary skill in the art upon reading and understanding the present specification.

BRIEF DESCRIPTION OF THE DRAWINGS

The invention may take form in various components and arrangements of components, and in various steps and arrangements of steps. The drawings are only for purposes of illustrating preferred embodiments, and are not to be construed as limiting the invention.

DETAILED DESCRIPTION OF PREFERRED EMBODIMENTS

Figure 1:
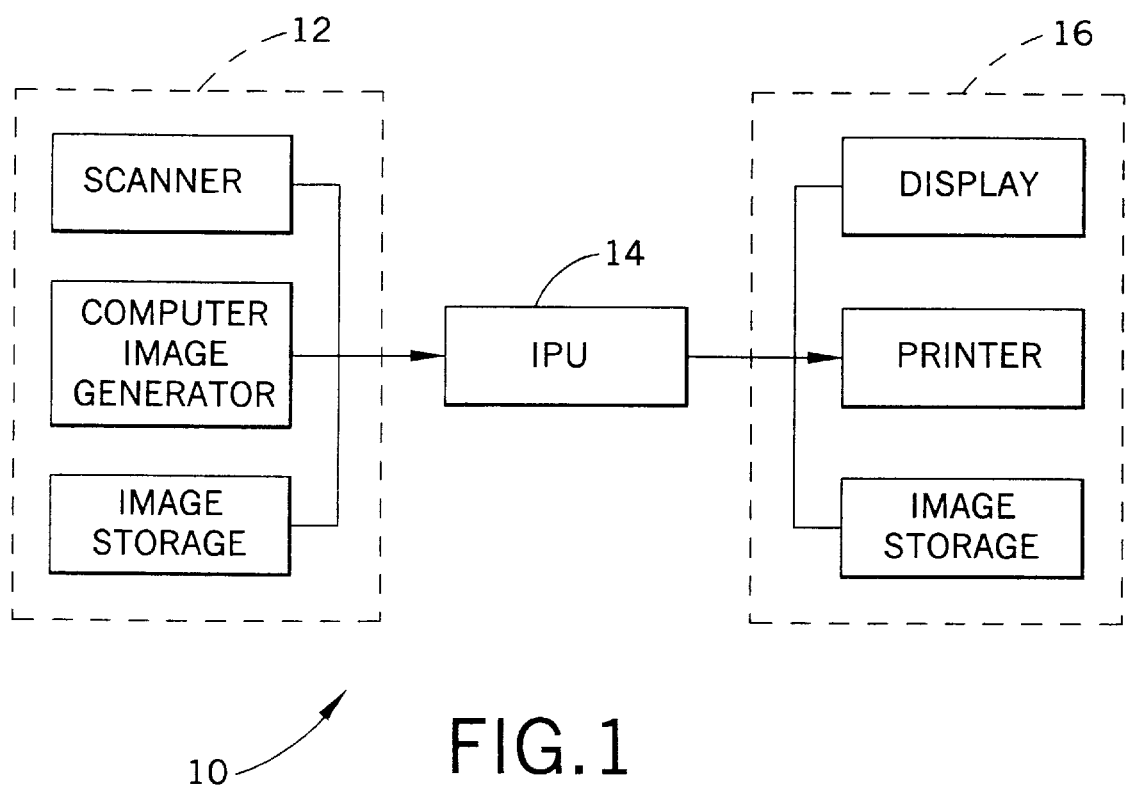
FIG. 1 is a block diagram illustrating a color digital image processing system in accordance with the present invention.

Referring now to the drawings where the showings are for purposes of describing preferred embodiments of the invention and not for purposes of limiting same, a color digital image processing system 10 is shown in FIG. 1. An image input terminal 12, comprising a scanner, computer image generator, an image storage device, or the like, derives or delivers digital color image data in the form of two or more monochromatic separations, wherein the picture elements or "pixels" of each separation are defined at a continuous tone depth of "c" bits per pixel where "c" is an integer.

Accordingly, each pixel has some grey value between full "off" ("0") and full "on" ("1")—e.g., 0.5 or 0.125. These color image signals are input to an image processing unit (IPU) 14 wherein digital color image processing in accordance with the present invention is performed. The image processing unit 14 outputs data in a suitable format to an image output terminal 16 such as a digital color printer. In particular, the printer 16 requires each pixel of each separation to be defined at a depth of "d" bits per pixel, where "d" is an integer less than "c." Commonly, and as described herein, the image output device is a binary device, requiring the grey value of each separation pixel to be defined merely in terms of "1" (on) or "0" (off). That is to say, the output device 16 typically cannot reproduce a pixel value equal to, for example, 0.5, i.e., it cannot print a 0.5 grey level for the pixel. The image output terminal 16 may also comprise a visual display and/or an image storage device. Suitable apparatus for color digital image input and/or output include the Pixelcraft 7650 Pro Imager Scanner, XEROX DocuTech Production Printing System scanners, the XEROX 5775 digital color copier, the XEROX 5760 and 5765 Majestik digital color copiers, or any other suitable digital color scanner and/or copier. Regardless of pixel grey value, the location of each pixel in the separation bitmaps is also defined, typically in terms of a row (m) and column (n).

Figure 2:
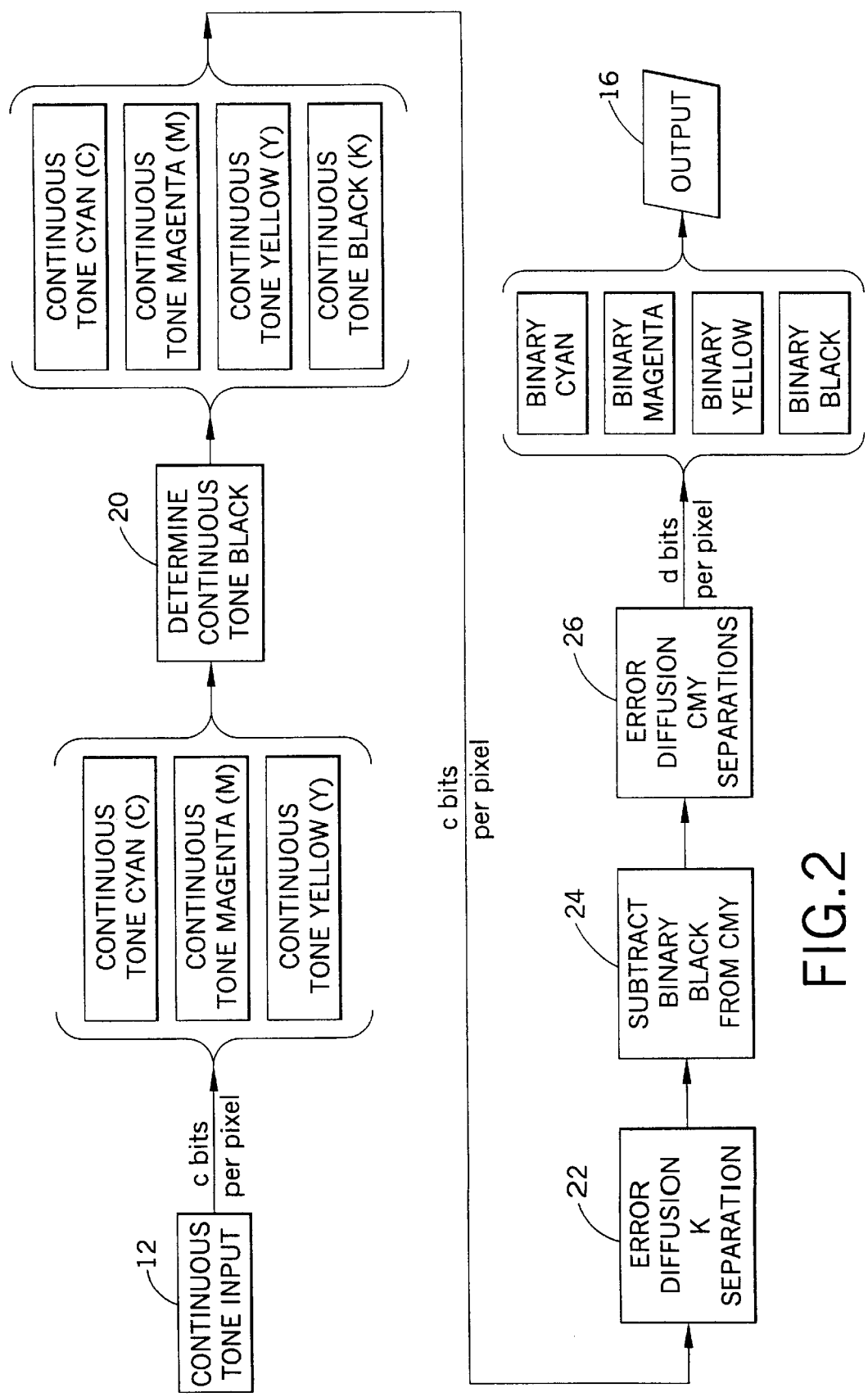
FIG. 2 diagrammatically illustrates error diffusion and UCR/GCR methods in accordance with the present invention; and, FIG. 3 diagrammatically illustrates error diffusion and UCR/GCR methods in accordance with an alternative embodiment of the present invention.

With reference also now to FIG. 2, the image input device provides continuous tone image signals in terms of "c" bits/pixel for each color separation. Printer 16 or other output device is a binary device and can reproduce only "on" or "off" pixels or each color separation. The data is input from the device 12 to the IPU 14 in terms of the color separations for the color space being implemented. As shown and discussed herein, data is input from the image input device 12 in terms of cyan (C) magenta (M), and yellow (Y) color separations. Those skilled in the art will recognize that any other suitable color space may be implemented, and that conversions may be readily made between various color space, without departing from the scope and intent of the present invention. For example, the image input device 12 may supply the image data in terms of the red, green, blue (RGB) color space, and the IPU 14 may convert the data to the cyan, magenta, yellow (CMY) or any other color space in a known manner.

The continuous tone C,M,Y separation pixel data is input to step or means 20 within the IPU 14 wherein the continuous tone data for each black (K) separation pixel is determined according to any suitable undercolor removal (UCR) method, also in terms of "c" bits per pixel, based upon the C,M,Y pixel values. It is important to note that the continuous tone C,M,Y separation pixel values remain unaltered by step or means 20.

The continuous tone pixel data for the C,M,Y,K color separations are input to step or means 22 within the image processing unit 14. Step or means 22 implements any of numerous well known scalar error diffusion methods, but only on the continuous tone black (K) separation pixel data, to redefine each black separation pixel in terms of "d" bits per pixel. As shown herein, each continuous tone pixel of the K separation is redefined by step or means 22 to a binary value "1" or "0."

Also within the image processing unit 14, on a pixel-by-pixel basis, a grey component replacement (GCR) step or means 24 subtracts the binary data for the black (K) separation from correspondingly located continuous tone pixels of the cyan (C), magenta (M), and yellow (Y) separations. That is to say, for a given black binary pixel K(m,n), the step or means subtracts either "1" or "0" from the corresponding cyan, magenta, and yellow continuous tone pixel data C(m, n), M(m,n), and Y(m,n). Accordingly the corresponding cyan, magenta, and yellow pixels C(m,n) M(m,n), and Y(m,n) pixels resulting from the subtraction would be rendered either negative (by the subtraction of "1") or would remain unaltered (by the subtraction of "0").

Following subtraction of the binary black (K) separation pixel data from the corresponding continuous tone C,M,Y separation pixel data for each pixel location (m,n), a step or means 26 within the IPU 14 performs error diffusion using any suitable error diffusion method on each of the C,M,Y separations to redefine each of the separation pixels of each separation in terms of "d" bits per pixel, i.e., into binary pixel data for the present example. Due to the previous subtraction of the binary black (K) pixel data from the corresponding continuous tone C,M,Y pixel data by step or means 24, it will be recognized that for a given black binary pixel K(m,n)=1, the correspondingly located continuous tone cyan, magenta, and yellow pixels C(m,n), M(m,n), and Y(m,n) pixels would each be negative (less than zero) following subtraction of the binary black (K) value therefrom, while for a given black binary pixel K(m,n)=0, the correspondingly located continuous tone cyan, magenta, and yellow pixels C(m,n), M(m,n), and Y(m,n) pixels would remain unaltered due to subtraction.

Where the continuous tone cyan, magenta, and yellow pixels C(m,n), M(m,n) and Y(m,n) have been rendered negative by the subtraction of the binary black (K) value K(m,n)=1 therefrom, it will be recognized that the error diffusion performed by step or means 26 will convert the pixels C(m,n), M(m,n), and Y(m,n) to a binary "0" (off), i.e., a negative pixel cannot exceed the threshold applied by the error diffusion algorithm. Accordingly, where K(m,n)=1, C(m,n), M(m,n), and Y(m,n)=0, indicating the presence of black ink and the absence of colored inks. Furthermore, the error due to the negative C(m,n), M(m,n), and Y(m,n) pixels is propagated to one or more adjacent pixels, e.g., to C(m,n+1), M(m,n+1), and Y(m,n+1), so that these adjacent pixels are also less likely to exceed the applied error diffusion threshold. Therefore, the present method not only prevents the output of C,M,Y inks at the same location of the K ink, but also discourages the output of the C,M,Y inks at pixel locations neighboring a black pixel.

On the other hand, where the continuous tone cyan, magenta, and yellow pixels C(m,n), M(m,n) and Y(m,n) have not been altered by the subtraction of the binary black (K) value K(m,n)=0 therefrom, it will be recognized that the error diffusion performed by step or means 26 will convert the pixels C(m,n), M(m,n), and Y(m,n) to either binary "0" (off) or binary "1" (on) in accordance to the error diffusion method applied, i.e., pixels that exceed the applied threshold will be set to "1" (on) and pixels that do not exceed the threshold will be set to "0" (off), with the resulting error being propagated in accordance with the particular error diffusion method applied. Thus, for a given black separation pixel K(m,n)=0, one or more of the separation pixels C(m, n), M(m,n), and Y(m,n) may be set to "1" (on) without the undesirable result of outputting black (K) ink at a location where cyan(C), magenta(M), and/or yellow (Y) ink is output.

The resulting binary separation pixel data for each color separation, such as the C,M,Y,K separations shown herein, are input to the printer or other output device 16 for output of the final image.

By way of example, the input device 12 may supply, or the IPU 14 may derive using known color space conversion techniques, continuous tone data for a pixel (m,n) of cyan C(m,n)=0.5, magenta M(m,n)=0.4, and yellow Y(m,n)= 0.25. The step or means 20 determines the continuous tone black (K) value K(m,n) in accordance with an undercolor removal (UCR) method. For example, step or means 20 may apply a 50% UCR method wherein K(,m,n) is set equal to 50% of the lowest of C(m,n), M(m,n), and Y(m,n). Thus, in the present example, K(m,n)=0.125. Step or means 22 performs error diffusion on the continuous tone black pixel data K(m,n) and determines if the black pixel K(m,n) is set to "1" or "0" based upon the error diffusion method. Assuming the application of step or means 22 results in K(m,n)=1, this value is then subtracted from each of the continuous tone input values C(m,n), M(m,n), and Y(m,n) by step or means 24, so that C(m,n)'=−0.5, M(m,n)'=−0.6, and Y(m,n)'=−0.75.

These continuous tone pixel values C(m,n)', M(m,n)', and Y(m,n)' are input to step or means 26, where an error diffusion method examines each pixel and determines if each is to be set to "1" or "0" based upon its value. Since each separation pixel C(m,n)', M(m,n)', and Y(m,n)' is negative where binary pixel data K(m,n)=1, they will not exceed the error diffusion threshold and will consequently be set to "0" where K(m,n)=1, i.e., no C,M,Y ink will be output at a location (m,n) where black ink is to be output, and C,M,Y ink may only be output where no black ink is to be output (i.e., where binary K(m,n)=0). is noted, during error diffusion of the C,M,Y separations, the negative nature of each pixel C(m,n)', M(m,n)', and Y(m,n)' is propagated to one or more neighboring pixels, thus driving the C,M,Y ink away from these locations also by lowering their continuous tone values.

Figure 3:
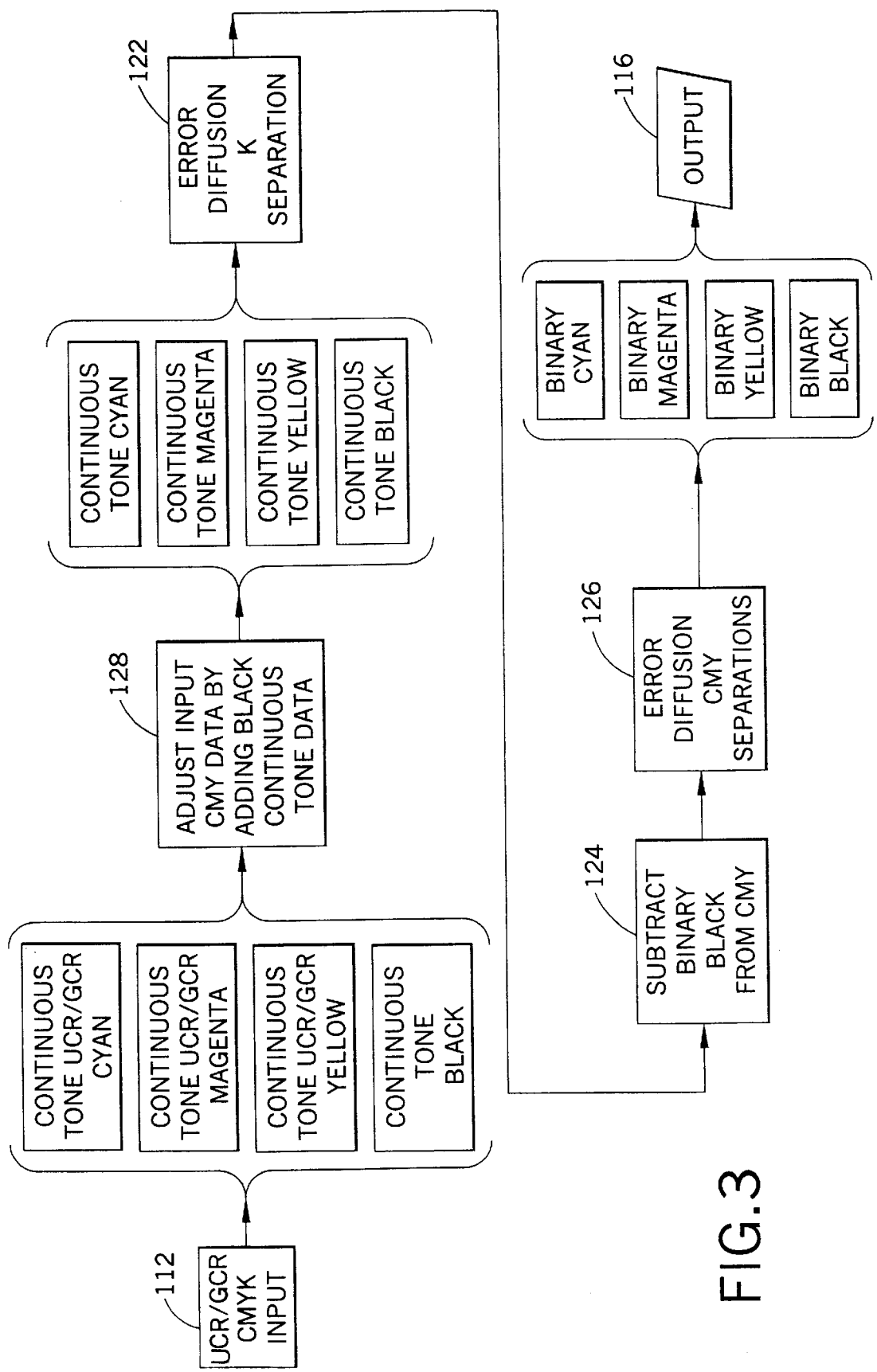

With reference now to FIG. 3, in certain applications, the input data is supplied from the image input device 112 in terms of UCR/GCR data. That is to say, the image input device 112 or some other upstream device has already performed the UCR and GCR steps tc determine the continuous tone black separation pixel data (UCR), and to adjust the continuous tone C,M,Y separation pixel data (GCR). In such case, the image processing unit (IPU) includes a step or means 128 which derives C,M,Y separation pixel data suitable for use with the supplied continuous tone black pixel separation data. More particularly, for each UCR/GCR separation pixel C(m,n)", M(m,n)", and Y(m,n)", the step or means 128 adds the continuous tone black pixel separation data K(m,n) thereto. Accordingly, the result is continuous tone data for each pixel C(m,n),M(m,n),Y(m,n), which is suitable for use along with the supplied continuous tone black separation data K(m,n) for each pixel.

The remaining steps or means 122,124,126,116 correspond exactly to the steps or means 22,24,26,16 previously discussed, respectively.

The invention has been described with reference to preferred embodiments. Modifications and alterations will occur to others upon reading and understanding the preceding specification. It is intended that the invention be construed as including all such modifications and alterations insofar as they fall within the scope of the appended claims or equivalents thereof.

Having thus described the preferred embodiments, the invention is claimed to be:

1. A method of printing a digital color image comprising:
receiving input pixel data at a first depth in terms of "c" bits per pixel, wherein 'c' is an integer, for at least three color separations of a digital color image;
deriving pixel data at the first depth of 'c' bits per pixel for a fourth separation of the digital color image based upon the pixel data of the three color separations;

performing an error diffusion operation on the pixel data of the fourth separation to redefine the pixel of the fourth separation data at a second depth of 'd' bits per pixel, where 'd' is an integer and 'd'<'c';

for each pixel of each of the three color separations, subtracting correspondingly located redefined pixel data of the fourth separation therefrom, respectively;

after said such subtracting performing an error diffusion operation on the pixel data of each of the three color separations to redefine the pixel data of each pixel of each separation in terms of 'd' bits per pixel;

outputting the pixel data in terms of 'd' bits per pixel for each of the three color separations and the fourth separation to an output device.

2. The method of printing a digital color image as set forth in claim 1, wherein the three color separations of the digital color image respectively represent cyan, magenta, and yellow colors of the digital color image, and wherein said fourth separation represents black.

3. The method of printing a digital color image as set forth in claim 1, wherein said first depth of 'c' bits per pixel defines each pixel of the three color separations and of the fourth separation at one of a plurality of continuous tone grey levels, and wherein said depth of 'd' bits per pixel defines each pixel of the three color separations and the fourth separation at one of two different grey levels.

4. The method of printing a digital color image as set forth in claim 1, wherein said step of deriving pixel data of the fourth separation includes performing an undercolor removal operation using pixel data from each of the three color separations at locations corresponding to each pixel of said fourth separation, without altering the pixel data of the three color separations.

5. A method of halftoning a continuous tone digital color image defined in terms of at least a first cyan pixel data separation, a second magenta pixel data separation, and a third yellow pixel data separation, each of said separations including pixel data for a plurality of pixels arranged in 'm' rows and 'n' columns, said method comprising:

from the pixel data at each pixel location (m,n) of the first, second, and third. separations, deriving continuous tone black pixel data for a location (m,n) to define a fourth, black pixel data, separation;

performing an error diffusion halftoning operation on the continuous tone pixel data of the fourth, black pixel data separation to convert the continuous tone black pixel data at each location (m,n) to binary pixel data;

for each pixel location (m,n) of each of the first second, and third pixel data separations, subtracting the corresponding binary black pixel data of the fourth separation at location (m,n) therefrom;

after said subtracting performing an error diffusion halftoning operation on each of the first, second, and third pixel data separations to convert the continuous tone pixel data of each separation into binary pixel separation data.

6. The method of halftoning a continuous tone digital color image as set forth in claim 5, further comprising:

inputting the binary pixel separation data of the first, second, third, and fourth separations to a printer for reproducing the binary pixel separation data for human perception.

7. A method of halftoning a digital color image comprising:

receiving continuous tone input pixel data for at least first, second, and third color separations and a fourth black separation of the digital color image, wherein at least a portion of the continuous tone pixel data of each pixel of the fourth black separation has been previously subtracted on a pixel-by-pixel basis from the continuous tone pixel data of each pixel of the first, second, and third color separations;

for all pixels of the first, second, and third color separations, respectively adding continuous tone pixel data from the corresponding pixel location of the fourth black separation;

performing an error diffusion halftoning operation on the continuous tone pixel data of the black separation to derive binary pixel data for each pixel of the black separation;

for the continuous tone pixel data at each pixel location of the first, second, and third color separations subtracting binary black pixel data from a corresponding location of the fourth black separation therefrom; and, after said subtracting performing an error diffusion operation on the continuous tone pixel data of the first, second, and third color separations to derive binary pixel data for each pixel of each of the first, second, and third separations.

8. The method of halftoning a digital color image as set forth in claim 7, further comprising:

inputting the binary pixel separation data of the first, second, third, and fourth separations to a printer for reproducing the binary pixel separation data for each separation.

9. The method of halftoning a digital color image as set forth in claim 7, wherein the continuous tone pixel separation data of the first, second, and third separations respectively represents cyan, magenta, and yellow colors of the digital color image.

10. An image processing unit for halftoning a digital color image, said image processing unit comprising:

means for receiving continuous tone pixel data for at least first, second, and third color separations;

means, connected to the receiving means, for deriving continuous tone pixel data of a fourth black separation based upon the pixel data of the first, second, and third separations;

means, connected to the deriving means, for performing error diffusion halftoning on the continuous tone pixel data of the fourth black separation to convert the continuous tone pixel data for each pixel into binary pixel data defining one of a pixel 'on' condition and a pixel 'off' condition;

means for receiving the binary pixel data of the fourth black separation and for subtracting the binary pixel data for each black pixel respectively from the continuous tone pixel data for each pixel of the first, second, and third color separations; and, means, connected to receive continuous tone data from the subtracting means, for performing error diffusion halftoning on the continuous tone pixel data of the first, second, and third color separations to convert the continuous tone color pixel data for each pixel of each color separation into binary pixel data defining one of a pixel 'on' condition and a pixel 'off' condition.

11. The image processing unit for halftoning a digital color image as set forth in claim 10, further comprising means for receiving binary pixel data of the first, second, third, and fourth separations and for printing the digital color image in accordance with the received binary pixel data for each separation.

12. The image processing unit for halftoning a digital color image as set forth in claim 10, wherein the continuous tone pixel data of the first, second, and third color separations represents cyan, magenta, and yellow color in the digital color image, respectively.

13. The image processing unit for halftoning a digital color image as set forth in claim 10, further comprising means for selectively adding continuous tone pixel data from the fourth black separation to pixel data at corresponding locations of the first, second, and third color separations, to account for a previous grey component replacement operation.

* * * * *